US012456367B2

(12) United States Patent
Mann et al.

(10) Patent No.: US 12,456,367 B2
(45) Date of Patent: Oct. 28, 2025

(54) REMOTE CONTROL HAVING A CAPACITIVE TOUCH SURFACE AND A MECHANISM FOR AWAKENING THE REMOTE CONTROL

(71) Applicant: Lutron Technology Company LLC, Coopersburg, PA (US)

(72) Inventors: Timothy Mann, Quakertown, PA (US); Matthew Philip McDonald, Phoenixville, PA (US); Lawrence R. Carmen, Jr., Bath, PA (US); Robert D. Stevens, Jr., Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/468,879

(22) Filed: Sep. 18, 2023

(65) Prior Publication Data

US 2024/0005778 A1 Jan. 4, 2024

Related U.S. Application Data

(63) Continuation of application No. 17/826,677, filed on May 27, 2022, now Pat. No. 11,798,403, which is a (Continued)

(51) Int. Cl.
*G08C 17/02* (2006.01)
*G08C 17/00* (2006.01)

(52) U.S. Cl.
CPC ............. *G08C 17/02* (2013.01); *G08C 17/00* (2013.01); *G08C 2201/12* (2013.01); *G08C 2201/30* (2013.01)

(58) Field of Classification Search
CPC .... G08C 17/00; G08C 17/02; G08C 2201/12; G08C 2201/30; H01H 2009/0257;
(Continued)

(56) References Cited

U.S. PATENT DOCUMENTS 4,195,210 A 3/1980 Pounds et al.
5,196,782 A 3/1993 D'Aleo et al.
(Continued)

FOREIGN PATENT DOCUMENTS

EP 2743952 B2 6/2014

*Primary Examiner* — Anthony R Jimenez
(74) *Attorney, Agent, or Firm* — Michael S. Czarnecki; Glen R. Farbanish; Philip N. Smith

(57) ABSTRACT

A remote control device having capacitive touch controls may be configured to enter a sleep state (or mode). For example, the remote control device may be configured to enter the sleep state upon expiration of an interval of time since a most recent button press. The remote control may be configured to awaken from the sleep state when one or more portions of a housing of the remote control are deflected, for example, when a user grasps the remote control to actuate one or more of the capacitive touch controls. For example, the remote control device may include a switch. The switch may include a carbon structure that may be configured to contact an open circuit pad on a circuit board to close the corresponding circuit when the housing is deflected and awaken the remote control device from the sleep state.

18 Claims, 11 Drawing Sheets

Related U.S. Application Data continuation of application No. 17/315,071, filed on May 7, 2021, now Pat. No. 11,348,450, which is a continuation of application No. 16/579,104, filed on Sep. 23, 2019, now Pat. No. 11,004,329, which is a continuation of application No. 15/340,734, filed on Nov. 1, 2016, now Pat. No. 10,424,192, which is a continuation of application No. 13/826,746, filed on Mar. 14, 2013, now Pat. No. 9,524,633.

(58) Field of Classification Search

CPC .. H01H 3/00; H01H 3/02; H01H 3/12; H01H 9/00; H01H 9/0044; H01H 9/02; H01H 9/0214; H01H 9/0235; H01H 9/16; H01H 9/161; H01H 9/167; H01H 9/18; H01H 9/181; H01H 9/182; H01H 13/00; H01H 13/04; H01H 13/14; H01H 13/26; H01H 13/50; H01H 13/705; H01H 13/86; H01H 2221/04; H01H 2223/00; H01H 2223/002; H01H 2223/003; H01H 2223/04; H01H 2300/022; H01H 2003/00; H01H 2003/007; H01H 2003/12; H01H 1/12; G09G 5/00; G06F 3/041

USPC ..... 361/832, 837, 271, 600, 679.01, 679.18, 361/679.21, 679.24, 679.3, 679.4, 736, 361/749; 362/600, 601, 615, 616, 551, 362/127, 97.1, 109, 319, 320, 335, 362; 340/12.54

See application file for complete search history.

(56) References Cited

U.S. PATENT DOCUMENTS

| | | | |
|---|---|---|---|
| 5,237,327 A | 8/1993 | Saitoh et al. | |
| 5,991,159 A | 11/1999 | Kraiczyk | |
| 6,011,546 A | 1/2000 | Bertram | |
| 6,803,728 B2 | 10/2004 | Balasubramaniam et al. | |
| 7,394,451 B1 | 7/2008 | Patten et al. | |
| 7,592,925 B2 | 9/2009 | Nearhoof et al. | |
| 7,605,689 B2 | 10/2009 | Hein et al. | |
| 7,855,543 B2 | 12/2010 | Newman, Jr. et al. | |
| 7,889,175 B2 | 2/2011 | Kryze et al. | |
| 8,390,481 B2 | 3/2013 | Pance et al. | |
| 10,437,348 B2 * | 10/2019 | Hayes | G06F 3/021 |
| 2005/0099402 A1 | 5/2005 | Nakanishi et al. | |
| 2005/0104853 A1 | 5/2005 | Sitalasai et al. | |
| 2005/0248534 A1 | 11/2005 | Kehlstadt | |
| 2006/0066588 A1 | 3/2006 | Lyon et al. | |
| 2006/0161870 A1 | 7/2006 | Hotelling et al. | |
| 2006/0161871 A1 | 7/2006 | Hotelling et al. | |
| 2006/0190750 A1 | 8/2006 | Maggi et al. | |
| 2006/0197750 A1 | 9/2006 | Kerr et al. | |
| 2006/0238517 A1 | 10/2006 | King et al. | |
| 2007/0024587 A1 | 2/2007 | Shiau | |
| 2007/0079155 A1 | 4/2007 | Liao et al. | |
| 2007/0103451 A1 | 5/2007 | Heimann et al. | |
| 2008/0026700 A1 | 1/2008 | Smith | |
| 2008/0074401 A1 | 3/2008 | Chung et al. | |
| 2008/0174570 A1 | 7/2008 | Jobs et al. | |
| 2009/0027341 A1 | 1/2009 | Arrigo et al. | |
| 2009/0122510 A1 | 5/2009 | Stiehl et al. | |
| 2010/0026656 A1 | 2/2010 | Hotelling et al. | |
| 2010/0117962 A1 | 5/2010 | Westerman et al. | |
| 2011/0074700 A1 | 3/2011 | Sharp | |
| 2011/0186414 A1 | 8/2011 | Kim et al. | |
| 2011/0288805 A1 | 11/2011 | Dejnabadi et al. | |
| 2012/0105358 A1 | 5/2012 | Momeyer et al. | |
| 2012/0154303 A1 | 6/2012 | Lazaridis et al. | |
| 2013/0201115 A1 * | 8/2013 | Heubel | G06F 3/0488 345/173 |
| 2013/0265698 A1 | 10/2013 | Baum et al. | |
| 2015/0043839 A1 | 2/2015 | Douthat | |

* cited by examiner

REMOTE CONTROL HAVING A CAPACITIVE TOUCH SURFACE AND A MECHANISM FOR AWAKENING THE REMOTE CONTROL

CROSS-REFERENCE TO RELATED APPLICATIONS

This application is a continuation of U.S. application Ser. No. 17/826,677, filed May 27, 2022; which is a continuation of U.S. application Ser. No. 17/315,071 filed May 7, 2021, now U.S. Pat. No. 11,348,450, issued May 31, 2022; which is a continuation of U.S. application Ser. No. 16/579,104 filed Sep. 23, 2019 now U.S. Pat. No. 11,004,329, issued May 11, 2021; which is a continuation of U.S. application Ser. No. 15/340,734, filed Nov. 1, 2016 now U.S. Pat. No. 10,424,192, issued Sep. 24, 2019; which is a continuation of U.S. application Ser. No. 13/826,746, filed Mar. 14, 2013, now U.S. Pat. No. 9,524,633, issued Dec. 20, 2016, each of which are hereby incorporated by reference herein in their entireties.

BACKGROUND

Components of load control systems (e.g., lighting load control systems) may be configured to be controlled using remote control devices. For example, a load control device (e.g., a wireless dimmer switch) associated with a remote control device in a load control system may be configured to be controlled via commands communicated wirelessly between the remote control device and the load control device. To preserve the usable life of one or more batteries that power remote control devices, the remote control devices may be configured to enter a sleep state. For example, upon an expiration of an interval of time after a recent button press, the remote control devices may enter a sleep state where the remote control devices may use little or no power from the batteries.

Additionally, to enhance aesthetic appeal, such remote control devices may be configured with one or more capacitive touch controls. For example, in lieu of discrete mechanical buttons, the remote control devices may include a touch screen responsive to a touch control or gesture such as a finger tap by a user thereof.

However, capacitive touch controls may be nonresponsive when the remote control device is in the sleep state. To enable the remote control device to be awakened from the sleep state such that the capacitive controls may become responsive, a mechanical button may be provided on the remote control devices. For example, a remote control device (e.g., a smart phone) may include a button protruding from a housing thereof or on a surface thereof. When pressed, the button may be configured to awaken the remote control device from the sleep state such that the remote control device may be used to control the lighting load. Unfortunately, providing such a button to awaken the remote control devices with capacitive touch controls on the housing or a surface thereof may diminish the aesthetic appeal of the remote control devices.

SUMMARY

A remote control device having capacitive touch controls may be configured to enter an sleep state. For example, the remote control device may be configured to enter the sleep state upon expiration of an interval of time since a most recent button press. The remote control may be configured to awaken from the sleep state almost or substantially concurrently with actuation of one or more of the capacitive touch controls. The remote control may be configured to awaken when one or more portions of a housing of the remote control are deflected, for example, when a user grasps the remote control to actuate one or more of the capacitive touch controls.

For example, the remote control device may include a switch that may be configured to awaken the remote control device from the sleep state. The switch may be configured as a hidden switch such that, e.g., the switch may be substantially enclosed within the housing of the remote control device. The switch may also be configured to be actuated upon deformation of a resiliently flexible portion of the housing, screen, or other components of the remote control device. For example, the switch may include a carbon structure such as a carbon pill configured to contact a portion of a printed circuit board when the housing is deformed. When the carbon structure contacts the printed circuit board, the carbon structure may close an open circuit such that the remote control device may interpret closure of the open circuit on the printed circuit board as a signal to awaken from the sleep state.

Additionally, the switch may be configured such that the carbon structure abuts the printed circuit board when the housing of the remote control is in a relaxed state. Deformation of the housing may then cause a force exerted by the carbon structure on the printed circuit board to change. The change in force may cause a resistance of the carbon pill with respect to the printed circuit board to change. Such a change in resistance may be interpreted by the remote control device as a signal to awaken from the sleep state. Alternatively or additionally, interaction with the remote control device may cause the carbon structure to deflect away from the printed circuit board such that the carbon structure may no longer abut the printed circuit board. The defection of the carbon structure away from the printed circuit board may cause a circuit closed by the carbon structure to be opened to become open. The opening of the circuit may be interpreted by the remote control device as a signal to awaken from the sleep state.

DETAILED DESCRIPTION

Figure 1:
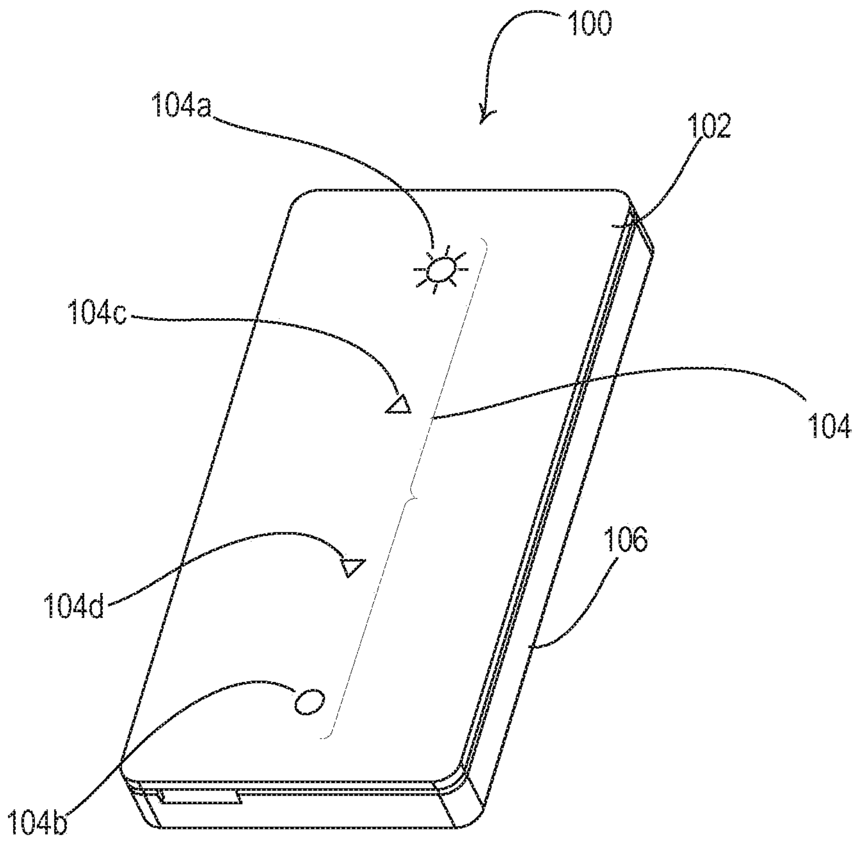
FIGS. 1 and 2 are perspective and front views, respectively, of an example remote control device having a plurality of capacitive touch controls disposed along a surface of the remote control device.
Figure 2:
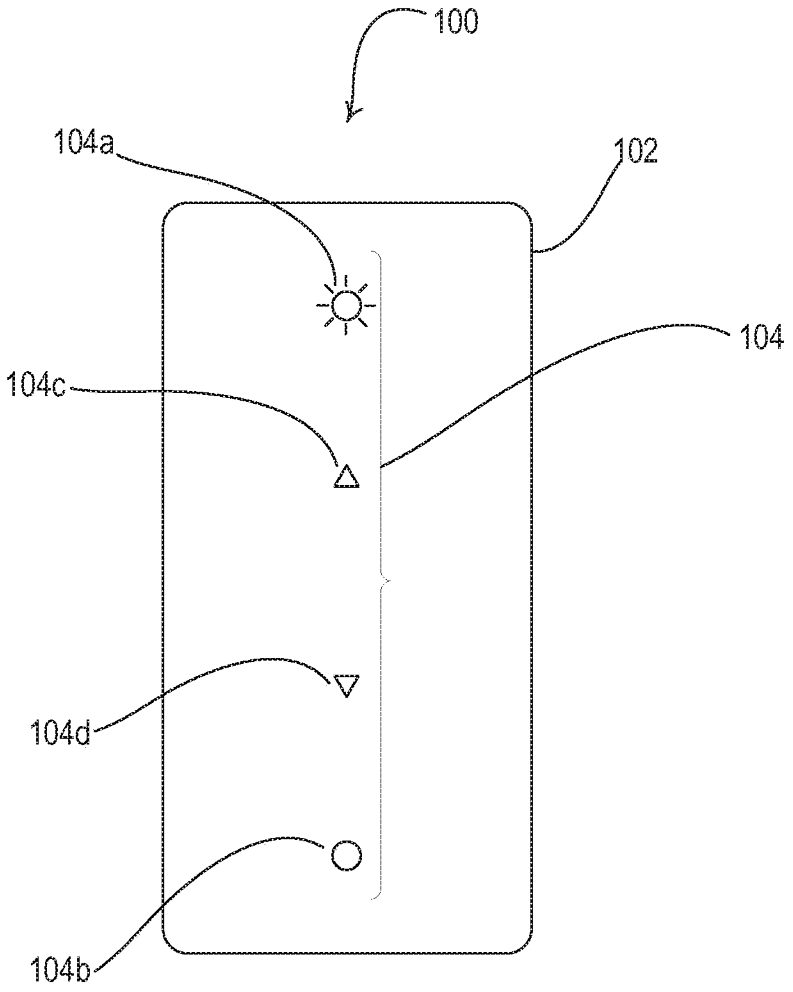

FIGS. 1 and 2 are perspective and front views, respectively, of a remote control device 100 comprising a capacitive touch surface 102 having areas defining a plurality of capacitive touch controls disposed along a surface of the remote control device 100. As described herein, the remote control device 100 may be configured to wirelessly control an electrical load such as a lighting load (not shown) in a load control system (e.g., lighting load control system). For example, a load control device (e.g., a wireless dimmer switch) (not shown) associated with a load control system may be controlled via commands communicated wirelessly from the remote control device (e.g., via packets or digital messages). In response to receiving such commands, the load control device may then control the load such as the lighting load by increasing or decreasing the power delivered to the load, turning on the load, turning off the load, and the like. Alternatively, the load such as the lighting load associated with the load control system may be controlled directly via commands communicated wirelessly from the remote control device 100. For example, the load may include an integral control circuit and may receive commands directly from the remote control device 100 and, in response to receiving such commands, the load may then control itself by increasing or decreasing the power delivered thereto, turning itself on, turning itself off, and the like. As described herein, the remote control device 100 may enter a sleep mode when it may not be used for a particular amount of time. For example, after a particular amount of time lapses after a last use of the remote control device 100 by a user, the remote control device 100 may enter a sleep mode such remote control device 100 may enter a low power state as described herein.

The capacitive touch surface 102 may be configured to be used to receive and communicate a touch control associated with user input such as a finger tap or other gestures to components in the remote control device 100 such that the load may be controlled in response to the user input via the remote control device 100 (e.g., either directly or via a load control device as described above). The capacitive touch surface 102 may be smooth (i.e., may not include a mechanical button thereon).

The capacitive touch surface 102 may also include a plurality of icons 104 such as an on icon 104*a*, an off icon 104*b*, a raise icon 104*c*, and a lower icon 104*d* that may be used to control the load. For example, a user may touch or tap the on icon 104*a* to turn on the load, may touch or tap the off icon 104*b* to turn off the load, may touch or tap the raise icon 104*c* to increase the intensity of the load, and/or may touch or tap the lower icon 104*d* to lower the intensity of the load. The plurality of icons 104 may be illuminated (e.g., backlit) on the capacitive touch surface 102 while the remote control device 100 is being used to indicate to a user thereof where to touch or tap to get a desired response (e.g., turn the load on, turn the load off increase the intensity of the load, and/or decrease the intensity of the load). Additionally, one or more of the icons 104 may be illuminated at a brighter intensity than the others. For example, the remote control device 100 may store an indication of the last icon of the plurality of icons 104 touched, tapped, or pressed before entering a sleep mode or state. When the remote control device 100 wakes up (e.g., from a sleep mode), the last icon of the plurality of icons 104 touched, tapped, or pressed may be illuminated on the capacitive touch surface 102 at a brighter intensity than the other icons. When the remote control device 100 enters a sleep mode or state when not being used, the plurality of icons 104 may no longer be illuminated (e.g., the backlights may be turned off) to conserve battery power.

The remote control device 100 further comprises a backcover housing 106. The backcover housing 106 may include a cavity (e.g., cavity 234 shown in FIG. 3) that may be configured to hold the components included remote control device 100. The backcover housing 106 may be made of a variety of materials that may deflect when, for example, picked up, touched, or grasped by a user. For example, the backcover housing 106 may be formed from a thin plastic material, metal, and/or a composite that may be configured to deflect or deform when touched by a user to actuate a touch control on the capacitive touch surface and awaken the remote control device 100 from the sleep mode or state (e.g., almost or substantially concurrent with the user touching the remote control device to actuate one or more of the capacitive touch controls).

Figure 3:
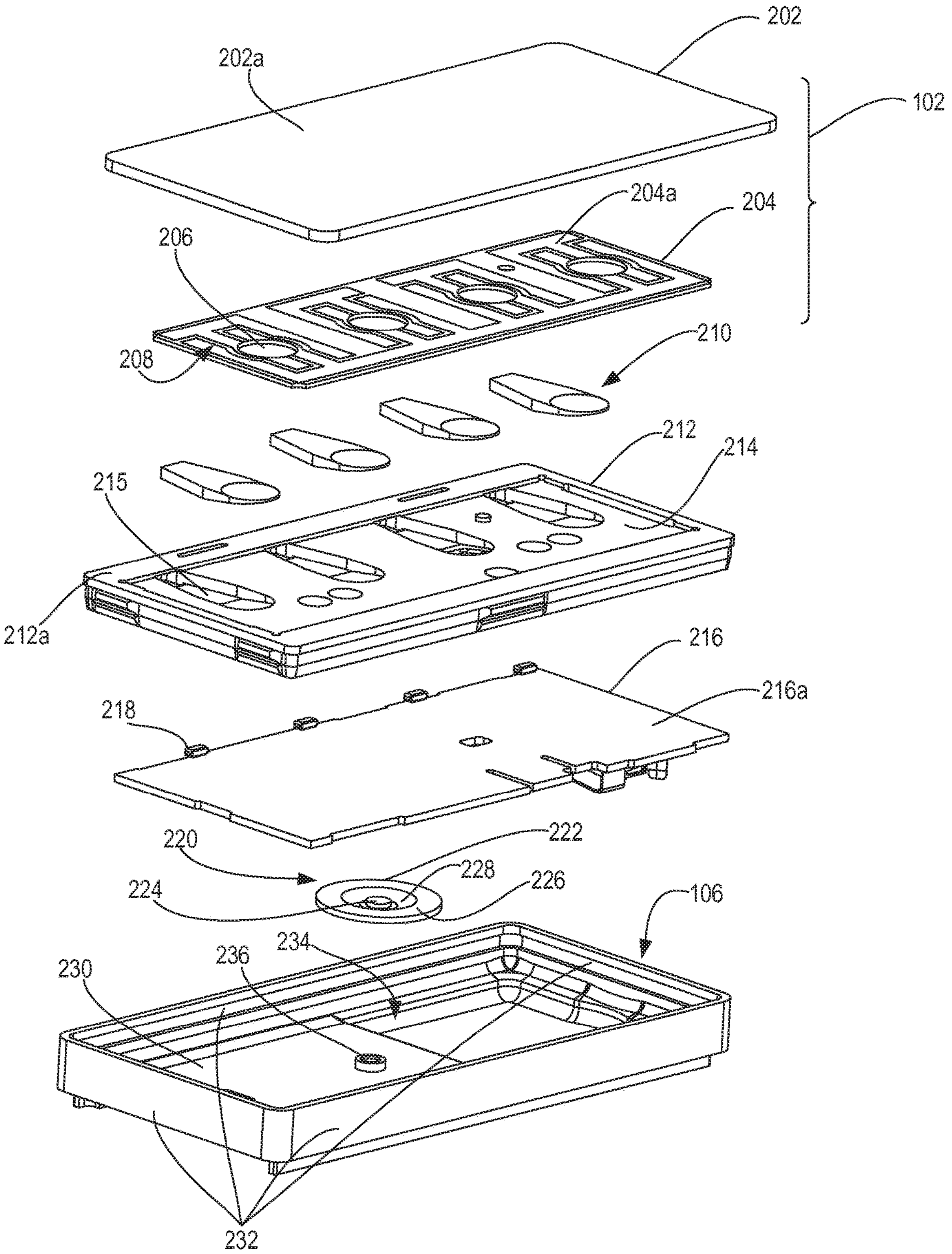
FIG. 3 is an exploded perspective view of an example remote control device.

FIG. 3 is an exploded perspective view of the remote control device 100. As shown, the remote control device 100 includes the capacitive touch surface 102, one or more light pipes 210, a sub-bezel 212, a printed circuit board (PCB) 216, a conductive member 220, and the backcover housing 106.

The capacitive touch surface 102 includes a front panel 202 and a capacitive touch electrode printed circuit board (PCB) 204 that may be coupled to or in contact with an inner surface (e.g., such as inner surfaces 502*b*, 602*b*, and 702*b* shown in FIGS. 5A-7B) opposite of an outer surface 202*a* of the front panel 202. The front panel 202 may be a substantially transparent substrate such as glass, plastic, and the like. Additionally, the front panel 202 may include the plurality of icons 104 (e.g., shown in FIGS. 1 and 2) printed on the inner surface thereof and displayed through to the outer surface 202*a*, which that may be tapped, touched, or interacted with by the user to receive or communicate the user input for controlling the load or the load control device. Alternatively, the remote control device 100 may include a display device (not shown) such as a liquid crystal display (LCD), a light emitting diode (LED) display, and the like that may display the plurality of icons 104 through the outer surface 202*a* of the front panel 202 such that the front panel 202 (e.g., the outer surface 202*a*) may be tapped, touched, or interacted with by the user where the plurality of icons 104 are displayed to receive or communicate the user input for controlling the load or the load control device.

The capacitive touch electrode PCB 204 may be adjacent to or abut the inner surface of the front panel 202. The capacitive touch electrode PCB 204 may include one or more openings 206 and one or more capacitive sensing portions 208 or electrodes surrounding the openings 206 on a first surface 204*a* thereof. The capacitive sensing portions 208 may include a capacitor having a capacitance value that changes depending on the front panel 202 being touched or not being touched by a user. As such, when the user touches the front panel 202 on one or more of the icons 104 the capacitive value may increase or decrease at such a location thereby signaling the user input of the particular icon to the remote control device 100.

As described, the remote control device 100 further includes a plurality of light pipes 210 that may be used to transport light and a sub-bezel 212 for housing the light pipes 210 that may be configured to be attached to or in contact with the capacitive touch electrode PCB 204 and a printed circuit board (PCB) 216. The light pipes 210 may be visible through the openings 206 in the capacitive touch electrode PCB 204. The light pipes 210 may include plastic or glass light tubes that may be used to direct illumination from light emitting diodes (LEDs) 218 organic LEDs on the PCB 216 to illuminate or indicate the plurality of icons 104 on the front panel 202. The light pipes 210 may include curving bends such as a convex bend or prismatic folds that may provide angled corners or structures for reflecting the light emitted by the LEDs 218 to illuminate the plurality of icons 104.

The sub-bezel 212 may be made of any suitable material such as plastic or metal and may be in any suitable shape such as a substantially flat, rectangular shape as illustrated. The sub-bezel 212 may define a depressed base portion 214 in a first surface 212*a* thereof. The depressed base portion 214 includes an outer perimeter that is dimensioned or sized to receive the capacitive touch electrode PCB 204 such that base portion 214 houses the capacitive touch electrode PCB 204 and a second surface (e.g., the surface opposite of the first surface 204*a* in contact with the front panel 202 such as second surfaces 504*b*, 604*b*, and 704*b* shown in FIGS. 5A-7B) of the capacitive touch electrode PCB 204 abuts the first surface 212*a* of the sub-bezel 212 in the area defined by the base portion 214. The base portion 214 also defines one or more recesses 215 therein that are dimensioned or sized to receive and house the light pipes 210.

The sub-bezel 212 may further include a second surface (e.g., such as second surfaces 512*b*, 612*b*, and 712*b* shown in FIGS. 5A-7B) opposite of the first surface 212*a*. The second surface of the sub-bezel 212 may abut or be in contact with the PCB 216. Additionally, the second surface of the sub-bezel 212 may define one or more receptacles (not shown) dimensioned or sized to receive the LEDs 218 provided by the PCB 216.

For example, the PCB 216 may include a substrate body that defines a first surface 216*a* of the PCB 216 and an opposed second surface (e.g., such as second surfaces 516*b*, 616*b*, and 716*b*). One or more electrical components such as the LEDs 218 may be attached (e.g., mounted) to one or both of the first surface 216*a* and second surface of the PCB 216 and placed in electrical communication with electrical circuits or circuit traces defined on the first surface 216*a*, the second surface, and/or in the substrate body of the PCB 216. As shown, the first surface 216*a* of the PCB 216 may be positioned adjacent to the second surface of the sub-bezel 212 such that the LEDs 218 on the first surface 216*a* may be received in receptacles (not shown) defined on the second surface 212*b* of the sub-bezel 212. The LEDs 218 may be side-illuminating to shine into the ends of the light pipes 210 (i.e., parallel to the plane of the PCB 216), such that the light pipe may illuminate the icons 104 on the front panel 202. Additionally, the substrate body may be sized such that at least a portion of the PCB 216 may be received in a cavity 234 of the backcover housing 106.

The second surface of the PCB 216 may support an open circuit pad (e.g., such as open circuit pad 324 shown in FIG. 4B) that defines an open circuit. The open circuit pad may provide a switch to awaken the remote control device 100 from a sleep mode after a period of non-use. For example, when a voltage is applied across the open circuit pad and the open circuit pad is closed, for example, by respective conductive elements, a signal having a select resistance or a voltage resulting therefrom may be generated. The signal may be translated by one or more components of the remote control device 100 such as a controller and/or other components on the PCB 216 to awaken the remote control device 100 from the sleep mode thereby illuminating or displaying the plurality of icons 104 on the front panel 202 such that the load may be controlled using the remote control device 100.

As shown, the remote control device 100 may further include conductive member 220. The conductive member 220 includes a membrane 222 and an activated carbon structure 224 configured as a carbon pill. The membrane 222 may be made of a resilient, deformable material such as rubber. The membrane 222 may define any suitable shape, for example, the illustrated substantially circular and partially spherical shape. For example, shown, the membrane 222 may have a circular rim 226 and a partial spherical body 228 attached to the rim 226 that defines an inward facing surface 228*a* and an opposed outward facing surface (e.g., such as outward facing surface 528*b*, 628*b*, and 728*b* shown in FIGS. 5A-7B).

The inward facing surface 228*a* of the partial spherical body 228 includes the activated carbon structure 224 attached thereto. The activated carbon structure 224 may define any suitable shape, for example, a substantially cylindrical shape as illustrated. It should be appreciated that the conductive member needs not be activated carbon structures, and that the remote control device may alternatively use any other suitable conductive member or switch to awaken the remote control device. For example, the conductive member may include or may be a mechanical tactile element or switch (not shown) mounted to the PCB 216 that may be configured to awaken the remote control device 100 from a sleep mode or state as described herein.

The conductive member 220, for example, the activated carbon structure 224 such as a carbon pill, may provide varying impedance in accordance with the amount of force applied to the conductive member 220 by the backcover housing 106. For example, when the membrane 222 is deflected, the activated carbon structure 224 of the conductive member 220 may be actuated against the open circuit pad on the PCB 216 such that activated carbon structure 224 may make contact with the open circuit pad on the PCB 216 to partially or substantially close the corresponding open circuit and awaken the remote control device 100 from a sleep mode.

As shown, the backcover housing 106 includes a bottom portion 230 and a plurality of sidewalls 232 that define the cavity 234 and support the capacitive touch surface 102 (e.g., the front panel 202 thereof may rest on edges of the sidewalls not attached to the bottom portion 230). The cavity 234 may hold the capacitive touch electrode PCB 204, the sub-bezel 212 including the light pipes 210, the PCB 216, and the conductive member 220. Additionally, as shown, the bottom portion 230 includes an impedance member support 236 on an interior surface. The impedance member support 236 may be a cylindrical shaped support that may be integrally formed with the backcover housing 106 or may be fixedly attached thereto and may be configured to abut or contact the outward facing surface of the partial spherical body 228 of the membrane 222. The bottom portion 230 may be deformable or may deflect. When the backcover housing 106 may be deformed or deflected, for example, after being picked up, touched, or grasped by a user (i.e., changed form a relaxed to a deformed state), the impedance member support 236 abutting the outward facing surface of the partial spherical body 228 may force the activated carbon structure 224 included on the inward facing surface 228*a* of the partial spherical body 228 of the membrane 222 upward into the open circuit pad of the PCB 216 to, for example, partially or substantially close the corresponding open circuit and awaken the remote control device 100 from a sleep mode as described herein. For example, a force may be exerted on the backcover housing 106 when the user may pick up or grasp the remote control device 100. Such a force may cause the backcover housing 106 to deform or deflect such that the impedance member support 236 may force the activated carbon structure 224 into the open circuit pad 324 of the PCB 216 to awaken the remote control from the sleep mode.

Figure 4A:
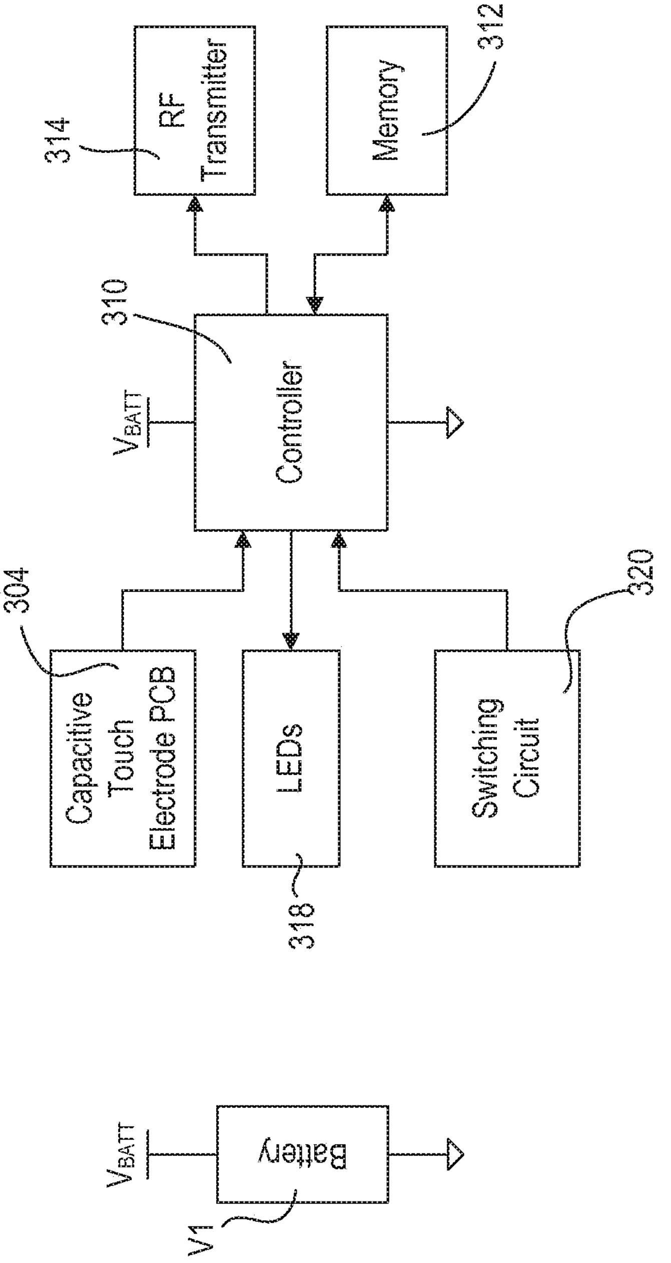
FIGS. 4A-4C are example electrical and schematic block diagrams, respectively, of components of an example remote control device.
Figure 4C:
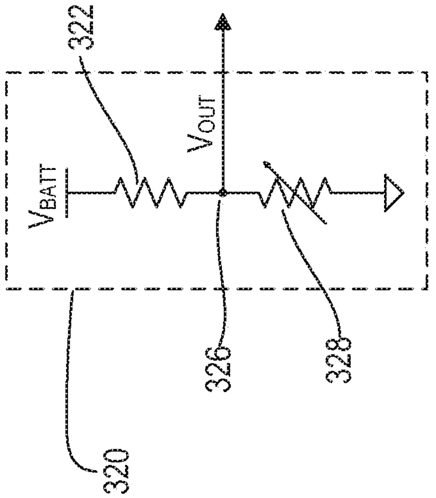
Figure 4B:
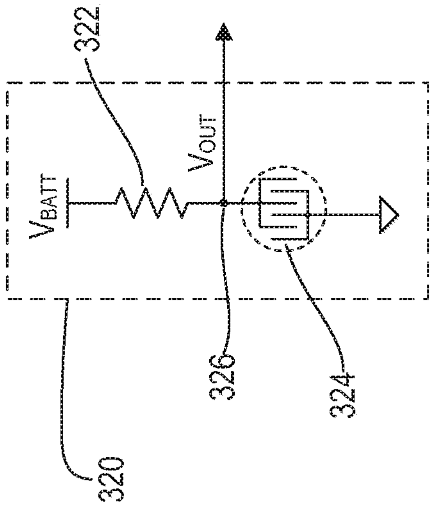

FIG. 4A is an electrical block diagram of components of an example remote control device. FIGS. 4B and 4C are simple schematic diagrams of components of the example remote control device. The remote control device may be, for example, the remote control device 100 depicted in FIGS. 1-3. As shown, the remote control device may include a control circuit, e.g., a controller 310. The controller 310 may be mounted to a PCB. The controller 310 may include one or more general purpose processors, special purpose processors, conventional processors, digital signal processors (DSPs), microprocessors, integrated circuits, a programmable logic device (PLD), application specific integrated circuits (ASICs), and/or the like. Additionally, the controller 310 may be operable to receive the user input from a capacitive touch electrode PCB 304 and a conductive member, to turn on LEDs 318 to illuminate a plurality of icons on a front panel of the remote control in response to a deflection of a backcover housing and the conductive member closing the open circuit pad 324, to turn off the LEDs 318 to un-illuminate the plurality of icons after a period of non-use (e.g., after a period of time has elapsed from the last use) of the remote control device, and/or to control other circuitry.

The remote control device also comprises a memory 312 operatively coupled to the controller 310 for storage of a unique identifier of the remote control device such as a serial number, a MAC address, and the like. For example, the unique identifier may be a seven-byte serial number that may be programmed into the memory 312 during manufacture of the remote control device. The memory 312 may include any component suitable for storing the information. For example, the memory 312 may include one or more components of volatile and/or non-volatile memory, in any combination. The memory 312 may be internal or external with respect to the controller 310. For example, the memory 312 and the controller 310 may be integrated within a microchip.

The remote control device may further include a battery V1. The battery V1 may provide a DC voltage $V_{BATT}$ (e.g., 6V) for powering the controller 310, the memory 312, the LEDs 318, and/or other circuitry of the remote control device such as the capacitive touch electrode PCB 304. The battery V1 may comprise a coin battery such as a 3-V lithium coin battery, an alkaline battery, a dry cell battery, and the like.

Additionally, the remote control device may include a wireless communication circuit 314, e,g., a radio-frequency (RF) transmitter coupled to an antenna for transmitting RF signals. In response to an actuation (e.g., a finger tapping or touching) of one of the plurality of icons 104 displayed on the front panel 202, the controller 310 may cause the wireless communication circuit 314 to transmit a packet or digital message to the load directly and/or to a load control device via one or more signals such as the RF signals, and the like. The transmitted packet or digital message may comprise a preamble, a serial number of the remote control device, which may be stored in the memory 312, and a command indicative as to which of the plurality of icons were pressed (i.e., on, off, raise, or lower). The controller 310 and/or the wireless communication circuit 314 may transmit a packet or digital message at a particular interval (e.g., every 100 ms), for example, to meet the FCC standards. Alternatively, the wireless communication circuit 314 could comprise an RF receiver for receiving RF signals, an RF transceiver for transmitting and receiving RF signals, or an infrared (IR) transmitter for transmitting IR signals.

The remote control device may also include a switching circuit 320. The switching circuit 320 may include an impedance element and/or an open circuit that may be in electrical communication with the impedance element. For example, as shown in FIGS. 4B and 4C, the impedance elements may include, for example, a resistor 322 that may be supported by the second surface of the PCB. The open circuit may also include, for example, the open circuit pad 324 supported by the second surface of the PCB.

As shown, the open circuit pad 324 may be in electrical communication with the resistor 322. For example, the switching circuit 320 may include a junction 326. The resistor 322 may be electrically connected to the battery V1 and to the open circuit pad 324 at a junction 326. It should be appreciated that the switching circuit is not limited to the illustrated arrangement of impedance element and open circuit. For example, the switching circuit 320 may be alternatively configured using more impedance elements, open circuits, and/or junctions, in any suitable arrangement.

The switching circuit 320 may be configured such that the open circuit pad 324 may be at least partially closed by a conductive member. For example, if a force is applied to the backcover housing (e.g., the backcover housing is deflected thereby changing the backcover housing from a relaxed state to a deformed state), the impedance member support on the interior surface of the backcover housing may bias the membrane such that the activated carbon structure may make contact with, and is placed in electrical communication with, the open circuit pad 324.

The conductive member, for example, the activated carbon structure such as a carbon pill may act as a variable resistor 238 that may provide varying impedance in accordance with the amount of force applied to the conductive member from the deflection of the backcover housing. For example, when a conductive member is actuated (e.g., inserted into the area within the dotted line shown in FIG. 4B) and placed in contact with or against the open circuit pad 324 with full force, the activated carbon structure of the conductive member may substantially close the open circuit, for example, such that the open circuit pad 324 may be effectively closed, and may impart a negligible resistance (e.g., substantially no resistance) to the switching circuit 320.

When the conductive member is actuated (e.g., inserted into the area within the dotted line shown in FIG. 4B) and placed in contact with or against the open circuit pad 324 with less than full force, the activated carbon structure of the conductive member may partially close the open circuit, for example, such that the open circuit pad 324 may be less than fully open or partially closed, and may impart some resistance to the switching circuit 320. Additionally, the conductive member, for example, the activated carbon structure may be preloaded into the open circuit pad 324 such that the open circuit pad 324 may be partially closed before actuation (e.g., deflection of the backcover housing) resulting the a variable resistance that may be represented by the variable resistor 328 before the switching circuit 320 may actually be actuated.

Responsive to the open circuit being closed (e.g., partially or fully) due to the deflection of the backcover housing, the switching circuit 320 may be actuated such that the switching circuit 320 may generate a signal to be that can be interpreted by the controller 310 to awaken one or more components of the remote control device 100 from a sleep mode. For example, the battery voltage $V_{BATT}$ may be applied across the switching circuit 320.

When the open circuit defined by the open circuit pad 324 may be closed (e.g., fully or partially), for example, due to the deflection of the backcover housing, the switching circuit 320 may be actuated and may output an output voltage signal $V_{OUT}$ calculated based on the amount of variable resistance (e.g., negligible or some) imparted from the open circuit being fully or partially closed. The output voltage signal $V_{OUT}$ may be provided as a control signal to a controller, such as the controller 310 of the remote control device 100, and may be indicative of whether to awaken the controller from a sleep mode to control components of the remote control device 100 such as the capacitive touch screen, LEDs, and the like. For example, the controller 310 may determine whether the magnitude of the control signal and/or the output voltage signal $V_{OUT}$ associated therewith may be above or below a threshold. When the magnitude of the control signal and/or the output voltage signal $V_{OUT}$ is above or below the threshold, the controller 310 may activate the capacitive touch surface 102 and may illuminate the icons 104 thereby generally awakening the remote control device 100 from the sleep mode.

Figure 5A:
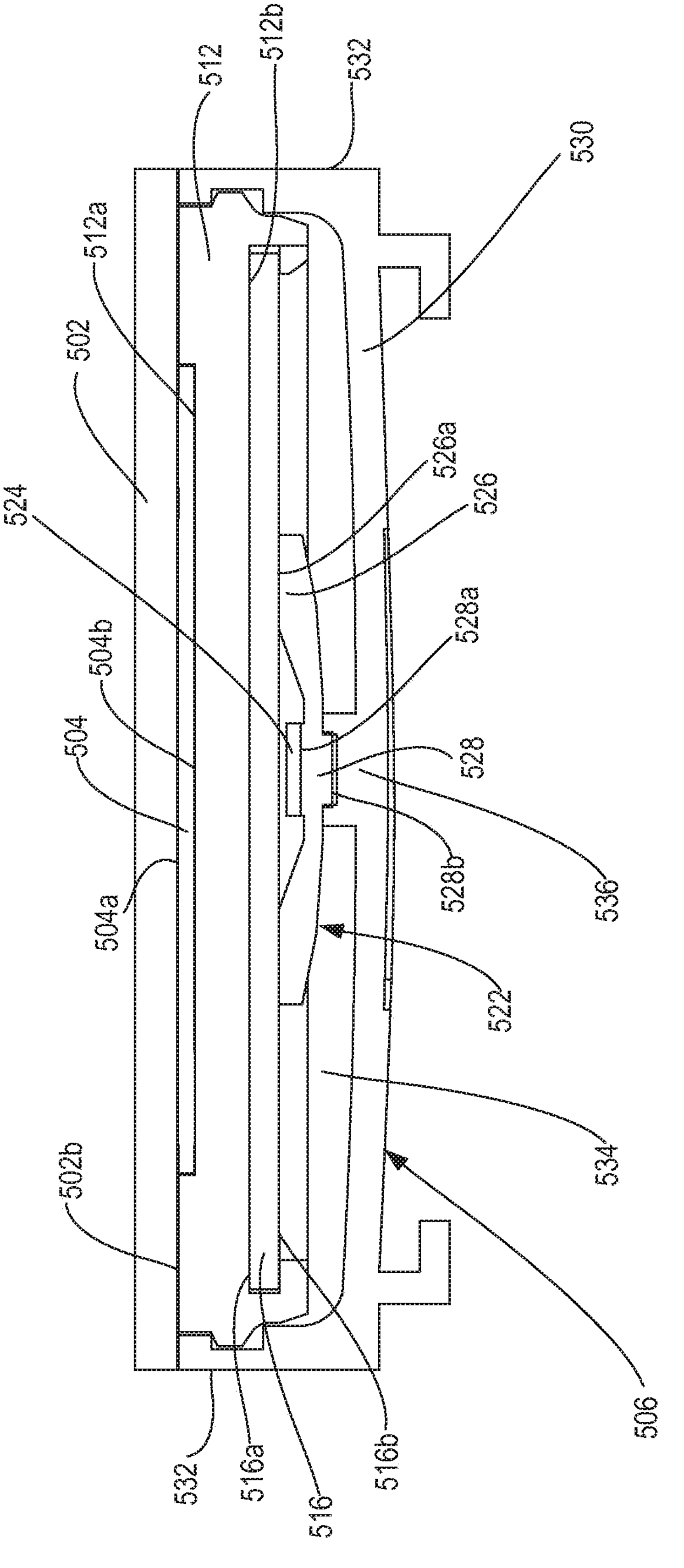
FIG. 5A is a cross-sectional end view of an example remote control device with a backcover housing in a relaxed state.

FIG. 5A is a cross-sectional end view of an example remote control device with a backcover housing 506 in a relaxed state. The example remote control device may be, for example, the remote control device 100 depicted in FIGS. 1-3. The backcover housing 506 may be made of a flexible material such as a flexible plastic. The backcover housing 506 may include a bottom portion 530, which may be exaggerated in shape and/or flexing to illustrate the deflecting and/or deformation thereof, and sidewalls 532 that define a cavity 534. In the relaxed state, the bottom portion 530 of the backcover housing 506 may be a convex shape such that the bottom portion 530 may be curved outward away from a PCB 516.

A capacitive touch electrode PCB 504, a sub-bezel 512, the PCB 516 and a conductive member 520 of the remote control device may be housed between a front panel 502 and the backcover housing 506 in the cavity 534. For example, a first surface 504*a* of the capacitive touch electrode PCB 504 may abut an inner surface 502*b* of the front panel 502 and a second surface 504*b* of the capacitive touch electrode PCB 504 may abut a first surface 512*a* of the sub-bezel 512. Additionally, a first surface 516*a* of the PCB 516 may abut a second surface 512*b* of the sub-bezel 512 and a second surface 516*b* of the PCB 516 may abut a portion of the conductive member 520.

As shown the conductive member 520 may include a membrane 522 and an activated carbon structure 524. The membrane 522 may include a rim 526 with a top surface 526*a*. The top surface 526*a* of the rim 526 may be in contact with a second surface 516*b* of the PCB 516. The membrane 522 may further include a partial spherical body 528. The partial spherical body 528 may extend toward the bottom portion 530 of the backcover housing 506 and away from the PCB 516 and top surface 526*a* of the rim 526. An outward facing surface 528*b* of the partial spherical body 528 of the membrane 522 may rest on an impedance member support 536. Additionally, an activated carbon structure 524 may be attached to an inward facing surface 528*a* of the partial spherical body 528 of the membrane 522. As shown, the activated carbon structure 524 may be spaced apart from the second surface 516*b* of the PCB 516 and an open circuit pad (e.g., such as the open circuit pad 324 shown in FIG. 4B) included thereon such that the activated carbon structure 524 may not be in contact with the open circuit pad on the second surface 516*b* of the PCB 516 and, thus, a switching circuit (e.g., such as the switching circuit 320 shown in FIGS. 4A-4C) may not be actuated to wake up the remote control device from a sleep mode.

Figure 5B:
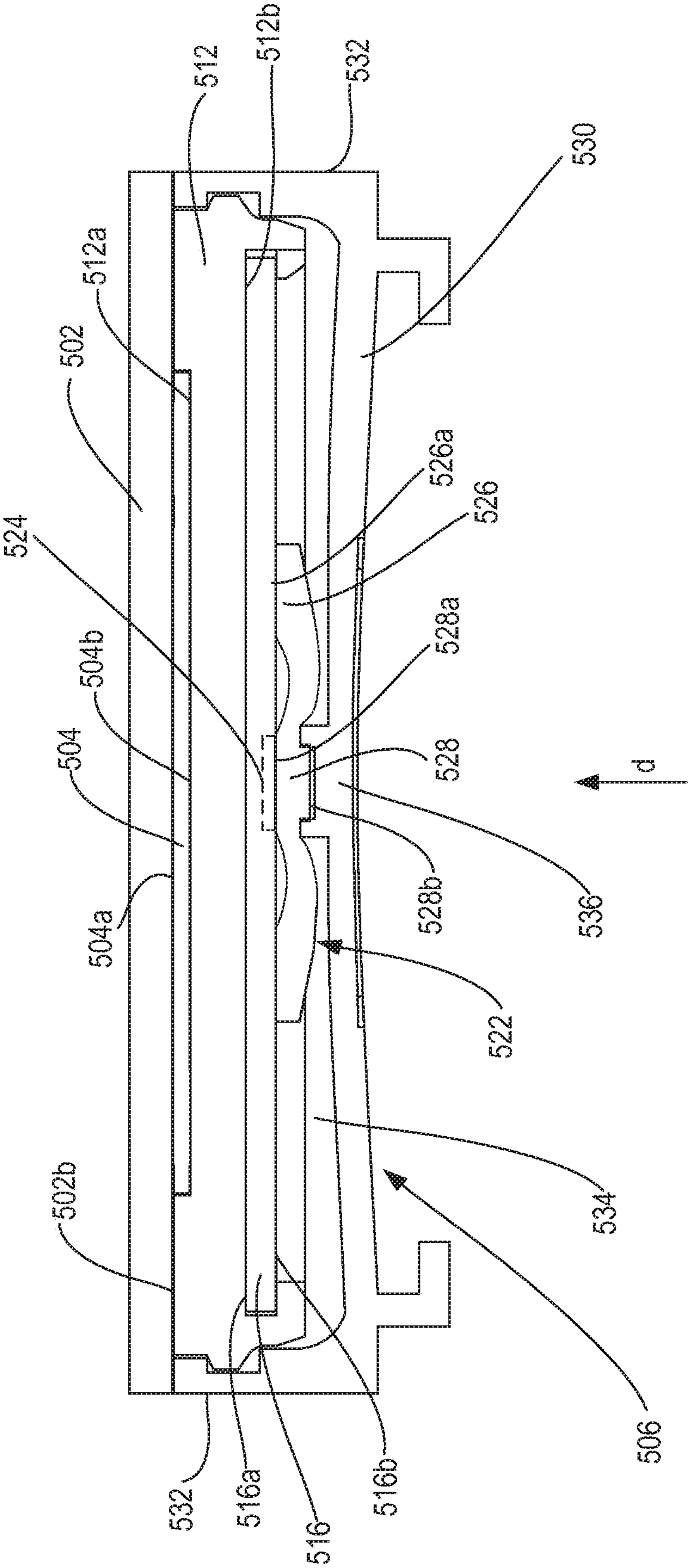
FIG. 5B is a cross-sectional end view of the example remote control device of FIG. 5A with the backcover housing in a deformed state.

FIG. 5B is a cross-sectional end view of the example remote control device of FIG. with the backcover housing 506 in a deformed state. For example, when the remote control device is picked up, touched, or grasped by a user, the bottom portion 530 of the backcover housing 506 may be deflected upwards in a first direction d and, thus, changed from the relaxed state shown in FIG. 5A to the deformed state shown in FIG. 5B such that the impedance member support 536 may force the partial spherical body 528 toward the PCB 516 thereby causing the activated carbon structure 524 to be inserted into the open circuit pad on the second surface 516*b* of the PCB 516.

As shown, in the deformed state, the bottom portion 530 of the backcover housing 506 may be changed from the convex shape to a concave shape such that the bottom portion 530 may be curved inward toward the PCB 516. Additionally, after being changed form the relaxed to the deformed state, the partial spherical body 528 may be curved toward the second surface 516*b* of the PCB 516 such that the activated carbon structure 524 included on the inward facing surface 528*a* of the partial spherical body 528 may be forced upward in the direction d. When forced upward in the direction d, the activated carbon structure 524 may be inserted into the open circuit pad, for example, partially or substantially close the corresponding open circuit and awaken the remote control device from the sleep mode as described herein.

Figure 6A:
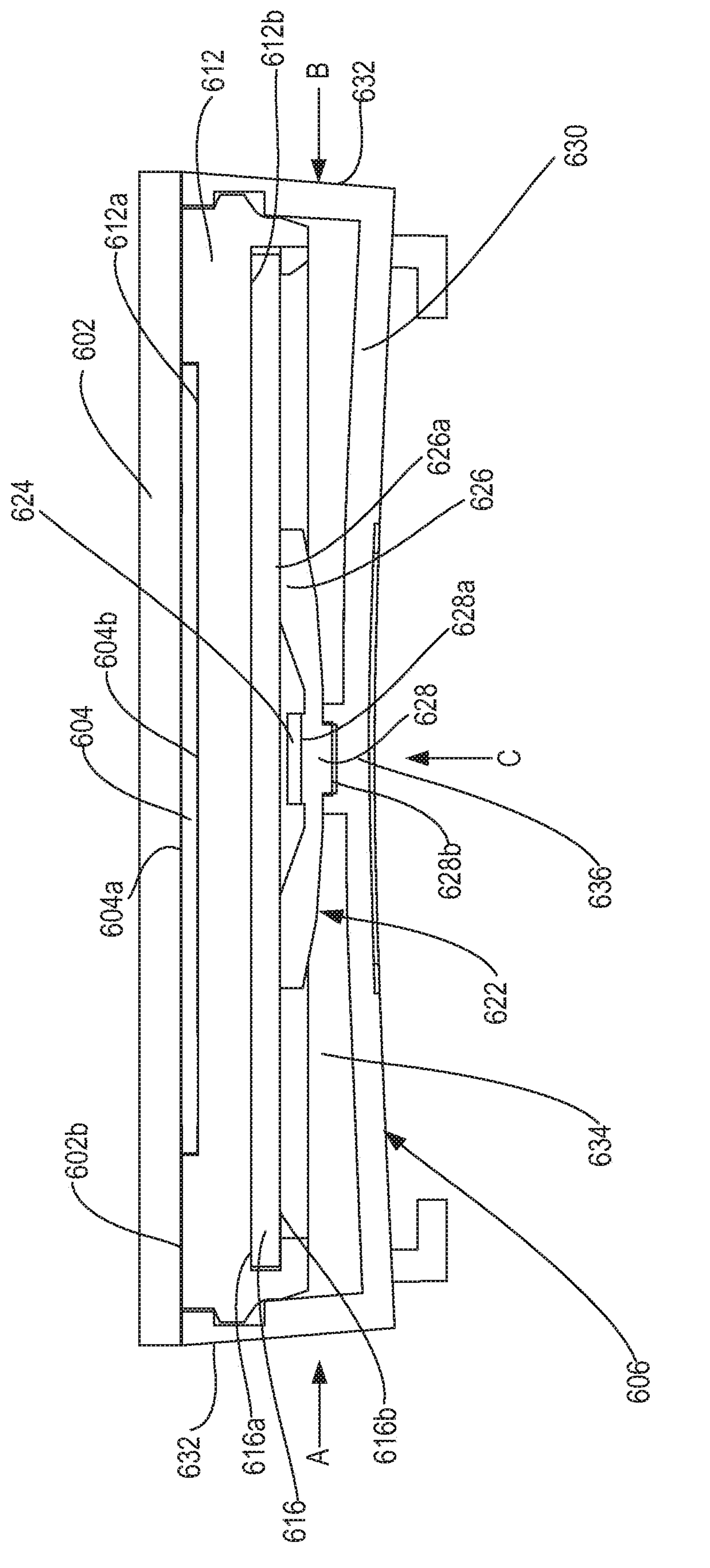
FIG. 6A is a cross-sectional end view of another example remote control device with a backcover housing in a relaxed state.

FIG. 6A is a cross-sectional end view of another example remote control device with a backcover housing 606 in a relaxed state. The example remote control device may be, for example, the remote control device 100 depicted in FIGS. 1-3. The backcover housing 606 may be made of a flexible material such as a flexible plastic. The backcover housing 606 may include a bottom portion 630, which may be exaggerated in shape and/or flexing to illustrate the deflecting and/or deformation thereof, and sidewalls 632 that define a cavity 634.

As shown, a capacitive touch electrode PCB 604, a sub-bezel 612, a PCB 616 and a conductive member 620 of the remote control device may be housed between a front panel 602 and the backcover housing 606 in the cavity 634. For example, a first surface 604*a* of the capacitive touch electrode PCB 604 may abut an inner surface 602*b* of the front panel 602 and a second surface 604*b* of the capacitive touch electrode PCB 604 may abut a first surface 612*a* of the sub-bezel 612. Additionally, a first surface 616*a* of the PCB 616 may abut a second surface 612*b* of the sub-bezel 612 and a second surface 616*b* of the PCB 616 may abut a portion of the conductive member 620.

In the relaxed state, the bottom portion 630 of the backcover housing 606 may be a slight concave shape such that the bottom portion 630 may be slightly curved inward toward the PCB 616. Additionally, the sidewalls 632 may be angled inward toward the bottom portion 630 with respect to the front panel 602 of the capacitive touch surface and angled outward toward the front panel 602 of a capacitive touch surface with respect to the bottom portion 630. For example, as shown, the sidewalls 632 may not be square with the front panel 602 and may form an angle with the front panel 602 of the capacitive touch surface that may be less than 90 degrees and an angle with the bottom portion 630 that may be greater than 90 degrees.

As shown, the conductive member 620 may include a membrane 622 and an activated carbon structure 624. The membrane 622 may include a rim 626 with a top surface 626*a*. The top surface 626*a* of the rim 226 may be in contact with the second surface 616*b* of the PCB 616. The membrane 622 may further include a partial spherical body 628. The partial spherical body 628 may extend toward the bottom portion 630 of the backcover housing 606 and away from the PCB 616 and the top surface 626*a* of the rim 626. An outward facing surface 628*b* of the partial spherical body 628 of the membrane 622 may rest on an impedance member support 636. Additionally, the activated carbon structure 624 may be attached to an inward facing surface 628*a* of the partial spherical body 628 of the membrane 622. As shown, the activated carbon structure 624 may be spaced apart from the second surface 616*b* of the PCB 616 and the open circuit pad (e.g., such as the open circuit pad 324 shown in FIG. 4B) included thereon such that the activated carbon structure 624 may not be in contact with the open circuit pad of the PCB 616 and, thus, a switching circuit (e.g., such as the switching circuit 320 shown in FIG. 4A-4C) may not be actuated to wake up the remote control device from a sleep mode.

Figure 6B:
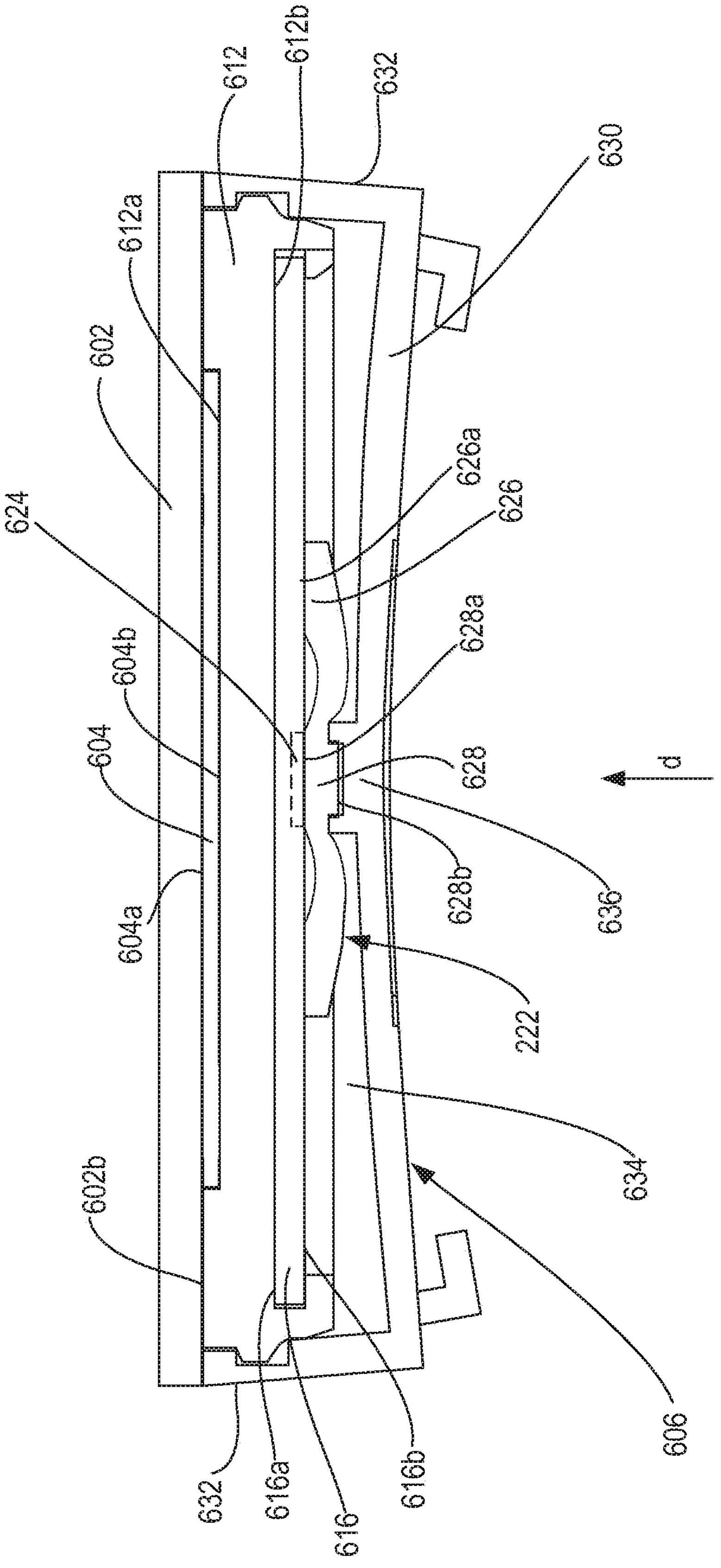
FIG. 6B is a cross-sectional end view of the example remote control device of FIG. 6A with the backcover housing in a deformed state.

FIG. 6B is a cross-sectional end view of the example remote control device of FIG. 6A with the backcover housing 606 in a deformed state. For example, when the remote control device is picked up, touched, or grasped by a user on the sidewalls 632 and/or the bottom portion 630 (e.g., at points A, B, and C), the bottom portion 630 of the backcover housing 606 may be deflected upwards in a first direction d and, thus, changed from the relaxed state shown in FIG. 6A to the deformed state shown in FIG. 6B such that the impedance member support 636 may force the partial spherical body 628 toward the PCB 616 thereby causing the activated carbon structure 624 to be inserted into the open circuit pad on the second surface 616*b* of the PCB 616.

As shown, in the deformed state, the bottom portion 630 of the backcover housing 606 may be more concave compared to the slight concave shape in FIG. 6A such that the bottom portion 630 may be further curved inward toward the PCB 616. As described above, after being changed from the relaxed to the deformed state, the partial spherical body 628 of the membrane 622 may be curved toward the second surface 616*b* of the PCB 616 such that the activated carbon structure 624 included on the inward facing surface 628*a* of the partial spherical body 628 may be forced upward in the direction d. When forced upward in the direction d, the activated carbon structure 624 may be inserted into the open circuit pad of the PCB 616 to, for example, partially or substantially close the corresponding open circuit and awaken the remote control device from the sleep mode as described herein.

Figure 7A:
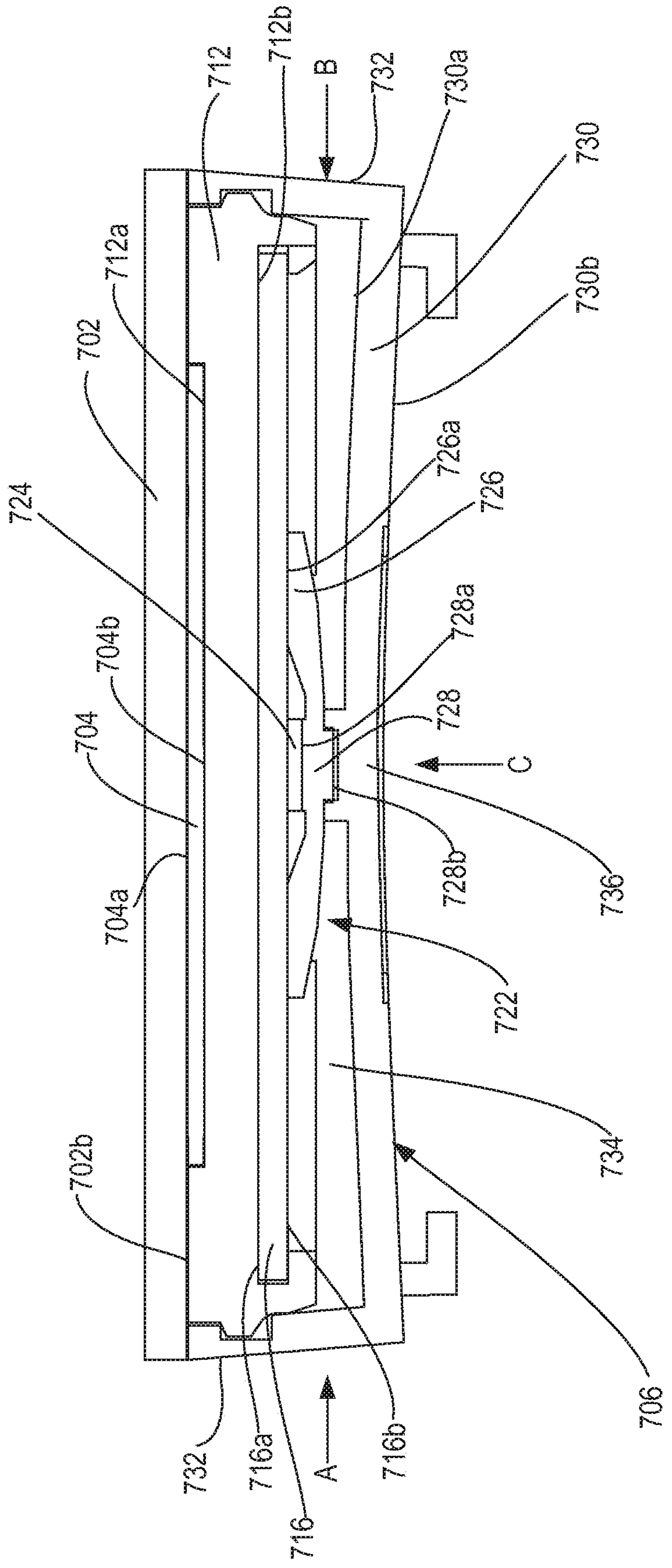
FIG. 7A is a cross-sectional end view of another example remote control device with a backcover housing in a relaxed state.

FIG. 7A is a cross-sectional end view of another example remote control device with a backcover housing 706 in a relaxed state. The example remote control device may be, for example, the remote control device 100 depicted in FIGS. 1-3. The backcover housing 706 may be made of a flexible material such as a flexible plastic. The backcover housing 706 may include a bottom portion 730, which may be exaggerated in shape and/or flexing to illustrate the deflecting and/or deformation thereof, and sidewalls 732 that define a cavity 734.

As shown, a capacitive touch electrode PCB 704, a sub-bezel 712, a PCB 716, and a conductive member 720 may be housed between a front panel 702 and the backcover housing 706 in the cavity 734. For example, a first surface 704*a* of the capacitive touch electrode PCB 704 may abut an inner surface 702*b* of the front panel 702 and a second surface 704*b* of the capacitive touch electrode PCB 704 may abut a first surface 712*a* of the sub-bezel 712. Additionally, a first surface 716*a* of the PCB 716 may abut a second surface 712*b* of the sub-bezel 712 and a second surface 716*b* of the PCB 716 may abut a portion of the conductive member 720.

In the relaxed state, the bottom portion 730 of the backcover housing 706 may be a slight concave shape such that the bottom portion 730 may be slightly curved inward toward the PCB 716. Additionally, the sidewalls 732 may be angled inward toward the bottom portion 730 with respect to the front panel 702 of a capacitive touch surface and angled outward toward the front panel 602 of the capacitive touch surface with respect to the bottom portion 730. For example, as shown, the sidewalls 732 may not be square with the front panel 702 and may form an angle with the front panel 702 of the capacitive touch surface that may be less than 90 degrees and an angle with the bottom portion 730 that may be greater than 90 degrees.

The conductive member 720 may include a membrane 722 and an activated carbon structure 724. The membrane 722 may include a rim 726 with a top surface 726*a*. The top surface 726*a* of the rim 726 may be in contact with the second surface 716*b* of the PCB 716. The membrane 722 may further include a partial spherical body 728. The partial spherical body 728 may extend toward the bottom portion 730 of the backcover housing 706 and away from the PCB 716 and the top surface 726*a* of the rim 726. An outward facing surface 728*b* of the partial spherical body 728 of the membrane 722 may rest on an impedance member support 636. Additionally, the activated carbon structure 724 may be attached to an inward facing surface 728*a* of the partial spherical body 728 of the membrane 722.

The activated carbon structure 724 may be preloaded such that the activated carbon structure 724 may be partially inserted and/or in contact with an open circuit pad (e.g., such as the open circuit pad 324 shown in FIG. 4B) on the PCB 716 and there may be no distance between the second surface 716*b* of the PCB 716 and the activated carbon structure 724. Even though the activated carbon structure 724 may be preloaded, the remote control device may remain in a sleep mode or state. For example, the variable resistance caused by the partial insertion of the activated carbon structure 724 in the open circuit pad (e.g., the force in which the activated carbon structure 724 may be inserted into the open circuit pad) may be large enough to cause an output voltage (e.g., such as the output voltage $V_{OUT}$ shown in FIGS. 4B-4C) generated from a switching circuit (e.g., such as the switching circuit 320 shown in FIGS. 4A-4C) to be above the threshold needed for a controller to wake up the remote control device from the sleep mode.

Figure 7B:
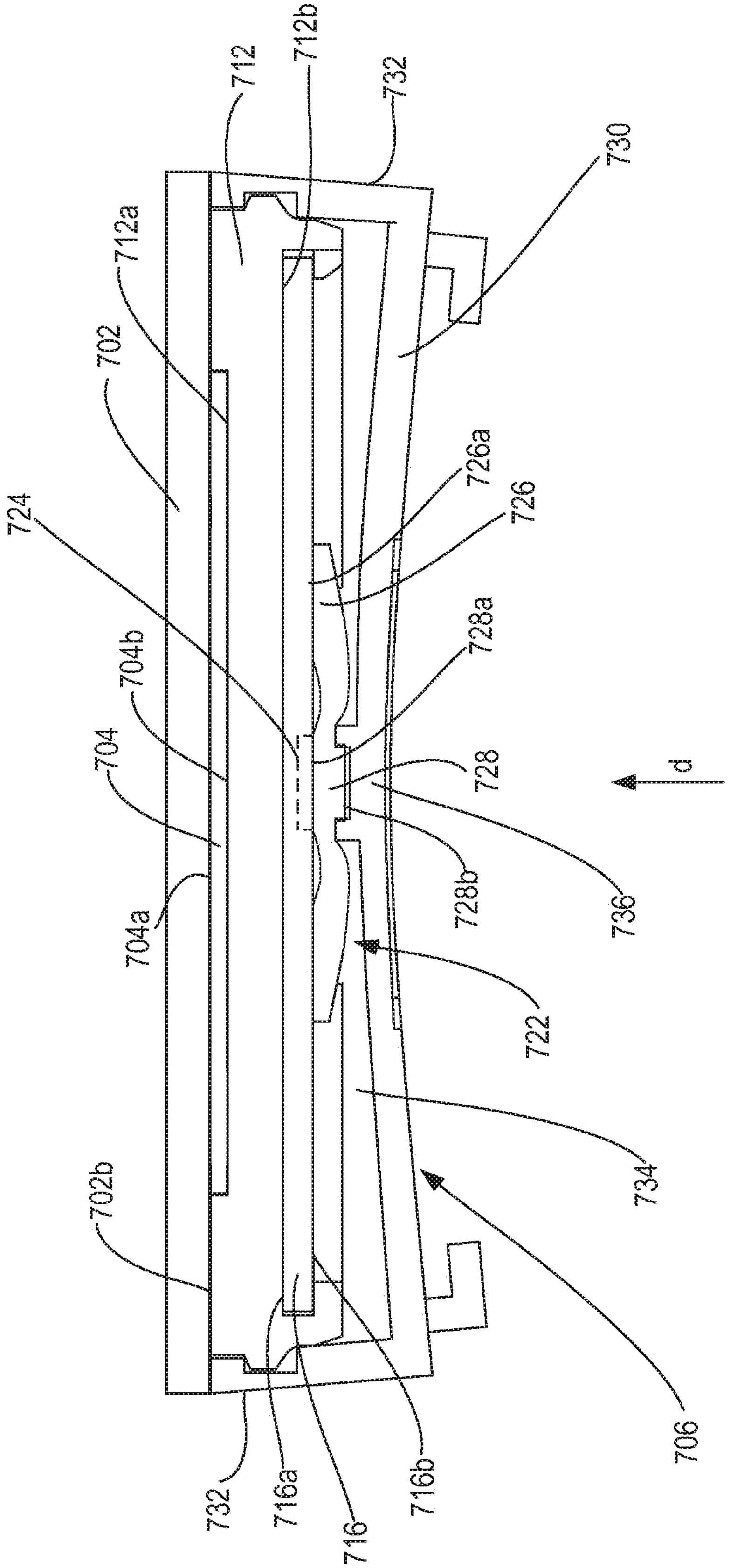
FIG. 7B is a cross-sectional end view of the example remote control device of FIG. 7A with the backcover housing in a deformed state.

FIG. 7B is a cross-sectional end view of the example remote control device of FIG. 7A with the backcover housing 706 in a deformed state. For example, when the remote control device is picked up, touched, or grasped by a user on the sidewalls 732 and/or the bottom portion 730 (e.g., at points A, B, and C), the bottom portion 730 of the backcover housing 706 may be deflected upwards in a first direction d and, thus, changed from the relaxed state shown in FIG. 7A to the deformed state shown in FIG. 7B such that the impedance member support 736 may force the partial spherical body 728 toward the PCB 716 thereby causing the activated carbon structure 724 to be inserted further into the open circuit pad on the second surface 716*b* of the PCB 716.

As shown, in the deformed state, the bottom portion 730 of the backcover housing 706 may be more concave compared to the slight concave shape in FIG. 7A such that the bottom portion 730 may be further curved inward toward the PCB 716. As described above, after being changed from the relaxed to the deformed state, the partial spherical body 728 of the membrane 722 may be curved toward the second surface 716*b* of the PCB 716 such that the activated carbon structure 724 included on the inward facing surface 728*a* of the partial spherical body 728 may be forced further upward in the direction d. When forced further upward in the direction d, the activated carbon structure 724 may be more fully inserted into the open circuit pad of the PCB 716 to close the corresponding open circuit and awaken the remote control device from the sleep mode as described herein. When forced further into the open circuit pad, the variable resistance caused by the partial insertion of the activated carbon structure 724 in the open circuit pad may be small enough to cause an output voltage (e.g., such as the output voltage $V_{OUT}$ shown in FIGS. 4B-4C) generated from a switching circuit (e.g., such as the switching circuit 320 shown in FIGS. 4A-4C) to be lower the threshold needed for a controller to wake up the remote control device from the sleep mode.

What is claimed is:

1. An electrical load device handheld controller, comprising:
- a housing having a front portion and a rear portion transversely opposed to the front surface across a thickness of the housing;
- a circuit board disposed in the housing;
- a variable impedance element disposed on an inside surface of the rear portion of the housing, the variable impedance element electrically coupled to at least one electrical circuit disposed on the circuit board;
  - wherein a force applied to the variable impedance element causes a change in an impedance of the variable impedance element;
- processor circuitry reversibly transitionable between a sleep state and an active state, the processor circuitry physically coupled to the circuit board and electrically coupled to the at least one electrical circuit, the processor circuitry to:
  - receive an input indicative of a change in impedance of the variable impedance element responsive to a force applied to the rear portion of the housing;
  - responsive to receipt of the input indicative of the change in impedance of the variable impedance element:
    - cause a transition of the processor circuitry from the sleep state to the active state.

2. The handheld controller of claim 1:
- wherein at least a portion of the rear portion of the housing comprises a flexible membrane; and
- wherein the variable impedance element is coupled to an inside surface of the flexible membrane.

3. The handheld controller of claim 1 wherein, responsive to the transition of the processor circuitry from the sleep state, the processor circuitry to further:
- cause a transition of one or more user actuatable element icons disposed on at least a portion of the front portion of the housing from a non-illuminated state to an illuminated state;
- wherein the one or more user actuatable element icons comprise:
- one or more icons disposed on a capacitive touch surface that forms at least the portion of the front portion of the housing.

4. The handheld controller of claim 3 wherein to cause the transition of the one or more user actuatable element icons from the non-illuminated state to the illuminated state, the processor circuitry to further:
- cause a backlight to transition to an illuminated state to illuminate the one or more icons disposed on the capacitive touch surface.

5. The handheld controller of claim 1 wherein to receive the input indicative of the change in impedance of the variable impedance element, the processor circuitry to further:
- receive a change in an input voltage, the change in input voltage indicative of the change in impedance of the variable impedance element.

6. The handheld controller of claim 5 wherein to cause the transition of the processor circuitry from the sleep state to the active state, the processor circuitry to further:
- determine whether the change in the input voltage exceeds a threshold value; and
- cause the transition of the one or more user actuatable element icons from the non-illuminated state to the illuminated state responsive to the determination that the change in input voltage exceeds the threshold value.

7. A method of controlling an electrical load device using a handheld controller, the method comprising:
- receiving, by processor circuitry in a sleep state, an input indicative of a change in impedance of a variable impedance element disposed on an inside surface of a rear portion of a handheld controller housing;
  - wherein the change of impedance is responsive to a force applied to the rear portion of the handheld controller housing; and
- causing, by the processor circuitry, a transition of from the sleep state to an active state responsive to the receipt of the input indicative of the change in impedance of the variable impedance element.

8. The method of claim 7 wherein receiving the input indicative of the change in impedance of the variable impedance element disposed on the inside surface of the rear portion of the handheld controller housing further comprises:
- receiving, by the processor circuitry, the input indicative of the change in impedance of the variable impedance element disposed on the inside surface of a flexible membrane that forms at least a portion of the rear portion of the handheld controller housing.

9. The method of claim 7 further comprising:
- causing, by the processor circuitry, a transition of one or more user actuatable element icons disposed on
- a capacitive touch surface that forms at least a portion of the front portion of the housing responsive to the transition of the processor circuitry to the active state.

10. The method of claim 7 further comprising:
- causing, by the processor circuitry, a transition of one or more icons disposed on the a capacitive touch surface that forms at least a portion of the front portion of the handheld controller housing using a backlight to illuminate the one or more icons disposed on the capacitive touch surface.

11. The method of claim 7 wherein receiving the input indicative of the change in impedance of the variable impedance element further comprises:

receiving, by the processor circuitry, a change in an input voltage, the change in input voltage indicative of the change in impedance of the variable impedance element.

12. The method of claim 11 wherein causing the illumination of the one or more user actuatable elements, further comprises:

determining, by the processor circuitry, whether the change in the input voltage exceeds a threshold value; and causing, by the processor circuitry, a transition of one or more user actuatable element icons disposed on a capacitive touch surface that forms at least a portion of the front portion of the handheld controller housing from a non-illuminated state to an illuminated state responsive to the determination that the change in input voltage exceeds the threshold value.

13. A non-transitory, machine-readable, storage device that includes instructions that, when executed by processor circuitry reversibly transitionable between a sleep state and an active state and disposed in an electric load control handheld controller, cause the processor circuitry to:

receive, while in the sleep state, an input indicative of a change in impedance of a variable impedance element disposed on an inside surface of a rear portion of an electric load control handheld controller housing;

wherein the change of impedance is responsive to a force applied to the rear portion of the electric load control handheld controller housing; and cause a transition from the sleep state to the active state responsive to the receipt of the input indicative of the change in impedance of the variable impedance element.

14. The non-transitory, machine-readable, storage device of claim 13 wherein the instructions that cause the processor circuitry to receive the input indicative of the change in impedance of the variable impedance element disposed on the inside surface of the rear portion of the electric load control handheld controller housing, further cause the processor circuitry to:

receive the input indicative of the change in impedance of the variable impedance element disposed on the inside surface of a flexible membrane that forms at least a portion of the rear portion of the handheld controller housing.

15. The non-transitory, machine-readable, storage device of claim 13 wherein the instructions that cause the processor circuitry to transition from the sleep state to the active state further cause the processor circuitry to:

cause a transition of one or more icons disposed on a capacitive touch surface that forms at least a portion of the front portion of the housing from a non-illuminated state to an illuminated state responsive to the transition of the processor circuitry to the active state.

16. The non-transitory, machine-readable, storage device of claim 13 wherein the instructions that cause the processor circuitry to transition from the sleep state to the active state further cause the processor circuitry to:

cause a backlight to illuminate one or more icons disposed on the capacitive touch surface that forms at least a portion of the front portion of the housing.

17. The non-transitory, machine-readable, storage device of claim 13 wherein the instructions that cause the processor circuitry to receive the input indicative of the change in impedance of the variable impedance element further cause the processor circuitry to:

receive a change in an input voltage, the change in input voltage indicative of the change in impedance of the variable impedance element.

18. The non-transitory, machine-readable, storage device of claim 17 wherein the instructions that cause the processor circuitry to cause the illumination of the one or more user actuatable elements further cause the processor circuitry to:

determine whether the change in the input voltage exceeds a threshold value; and cause a transition of one or more user actuatable element icons disposed on a capacitive touch surface that forms at least a portion of the front portion of the handheld controller housing from a non-illuminated state to an illuminated state responsive to the determination that the change in input voltage exceeds the threshold value.

* * * * *